US009455902B2

(12) United States Patent
Theogaraj et al.

(10) Patent No.: US 9,455,902 B2
(45) Date of Patent: Sep. 27, 2016

(54) IGMP/MLD LEAVE UPON CLIENT DISASSOCIATION OR USER IDLE TIMER EXPIRY

(71) Applicant: Aruba Networks, Inc., Sunnyvale, CA (US)

(72) Inventors: Isaac Theogaraj, Bangalore (IN); Sheausong Yang, Saratoga, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 97 days.

(21) Appl. No.: 14/529,950

(22) Filed: Oct. 31, 2014

(65) Prior Publication Data
US 2016/0127221 A1 May 5, 2016

(51) Int. Cl.
*H04L 12/28* (2006.01)
*H04L 12/761* (2013.01)
*H04L 29/06* (2006.01)
*H04L 12/18* (2006.01)

(52) U.S. Cl.
CPC ............... *H04L 45/16* (2013.01); *H04L 12/18* (2013.01); *H04L 69/08* (2013.01)

(58) Field of Classification Search
CPC ........ H04L 46/16; H04L 69/08; H04L 12/18
See application file for complete search history.

(56) References Cited

U.S. PATENT DOCUMENTS

| 6,085,238 | A | * | 7/2000 | Yuasa | H04L 12/4641 |
| | | | | | 370/409 |
| 6,791,981 | B1 | * | 9/2004 | Novaes | H04L 12/18 |
| | | | | | 370/390 |
| 2007/0058646 | A1 | * | 3/2007 | Hermoni | H04L 12/18 |
| | | | | | 370/401 |
| 2008/0225698 | A1 | * | 9/2008 | Smith | H04L 12/1863 |
| | | | | | 370/218 |
| 2009/0073912 | A1 | * | 3/2009 | Bauchot | H04L 12/1854 |
| | | | | | 370/312 |
| 2012/0130762 | A1 | * | 5/2012 | Gale | G01C 21/20 |
| | | | | | 705/7.13 |
| 2015/0078380 | A1 | * | 3/2015 | Wijnands | H04L 12/1886 |
| | | | | | 370/390 |
| 2015/0146603 | A1 | * | 5/2015 | Wu | H04L 12/189 |
| | | | | | 370/312 |
| 2015/0312140 | A1 | * | 10/2015 | Yang | H04L 12/1863 |
| | | | | | 370/218 |

\* cited by examiner

*Primary Examiner* — Robert Wilson
(74) *Attorney, Agent, or Firm* — Hewlett Packard Enterprise Patent Department

(57) ABSTRACT

According to one embodiment, a non-transitory computer readable medium comprising instructions which, when executed by one or more hardware processors, causes performance of operation comprising: determining that a client device, in a first Internet Protocol (IP) subnet, is subscribed to a multicast group; determining that the client device is no longer in the first IP subnet; responsive to determining that the client device is no longer in the first IP subnet, transmitting a message on behalf of the client device to unsubscribe the client device from the multicast group is shown.

19 Claims, 5 Drawing Sheets

IGMP/MLD LEAVE UPON CLIENT DISASSOCIATION OR USER IDLE TIMER EXPIRY

FIELD

Embodiments of the disclosure relate to improving the handling of multicast stream subscriptions of client devices within a communication network.

GENERAL BACKGROUND

In recent years, Wireless Local Area Network (WLAN) technologies have emerged as a fast-growing market. Among the various WLAN technologies, Institute of Electrical and Electronics Engineers (IEEE) 802.11 standard is the dominating technology and is frequently used for WLANs.

Client devices within WLANs communicate with access points in order to obtain access to one or more network resources. An access point, referred to as an "AP," is a digital device that operates as a gateway for a client device to establish a connection (e.g., a communicative coupling) with one or more networks (e.g., the Internet, an intranet, etc.). For example, an AP may be implemented as a wireless AP, which is configured to communicate wirelessly with one or more client devices as well as communicate with a networked device associated with the one or more networks, such as a controller for example, through a wired connection.

With respect to enterprise networks and other types of expansive multiple controller-based networks, conventional WLAN architectures do not manage the multicast stream subscriptions of client devices connected to the WLAN efficiently. For instance, a client device may communicatively couple to a first AP that is associated with a first controller located in a first Internet Protocol (IP) subnet and/or a first Virtual Local Area Network (VLAN). The client device may then subscribe to a multicast stream. Subsequently, the client device may roam to a second AP associated with a second controller due to a change in location of the client, device, failure of the first AP, greater signal strength for the second AP, or for a number of other reasons.

The second controller may be located in the first IP subnet or located in a second IP subnet. When the client device fails to unsubscribe to the multicast stream prior to roaming to the second AP and associating with the second controller, the multicast rooter may send unnecessary multicast transmissions. When the client device roams to a second controller that is located within a second IP subnet, the multicast router will continue to send the multicast stream to which the client device subscribed to the first IP subnet. When no other client devices are associated to a controller in the first IP subnet, the transmission of the multicast stream to the first IP subnet is unnecessary. The unnecessary transmission wastes network bandwidth between the multicast router and the one or more controllers located in the first IP subnet.

Currently, a multicast router will prune list of recipients of a multicast stream after the expiry of a particular amount of time. However, this amount of time may be in the order of minutes. Therefore, when a client device subscribing to a multicast stream roams without unsubscribing from the multicast stream and associates with a controller located in a second IP subnet, network bandwidth will be wasted until the multicast router prunes the list of recipients.

BRIEF DESCRIPTION OF THE DRAWINGS

The disclosure may best be understood by referring to the following description and accompanying drawings that are used to illustrate embodiments of the disclosure.

DETAILED DESCRIPTION

Figure 1:
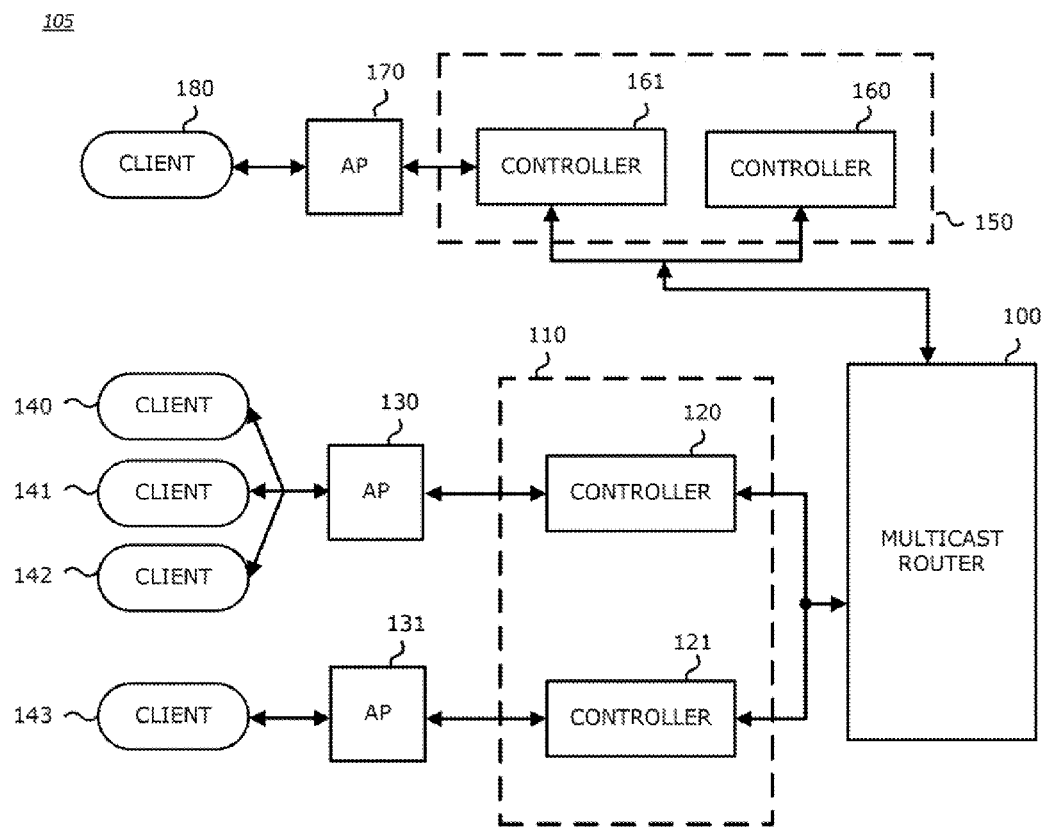
FIG. 1 is a diagram of an exemplary network system including a multicast router.

Various embodiments of the disclosure relate to the configuration of controllers in first IP subnet and/or a first VLAN within a WLAN to unsubscribe from a multicast stream on behalf of a client device when the client device leaves the first IP subnet/VLAN. As the WLAN may be configured such that one or more controllers may be located within different IP subnets wherein the IP subnets may be implemented using VLANs, the term "IP subnet" as used herein should be interpreted as meaning either an IP subnet or a VLAN. Although multiple controllers may be located within the same IP subnet within a WLAN, a first controller does not necessarily share information regarding the multicast subscriptions of client devices with a second controller in the same IP subnet.

Each controller may snoop the data transmitted by the one or more client devices associated with the controller. For example, a controller may snoop Internet Group Management Protocol (IGMP) packets transmitted by client devices associated with the controller. Each controller can maintain a multicast stream subscription table that stores the multicast subscriptions of each client device associated with the controller.

When a controller determines that a client device has roamed, e.g., disassociated from the controller, the controller will remove the client device—multicast subscription pairings stored in the controllers multicast stream subscription table. In addition, when the controller determines that the client device has roamed out of the IP subnet within, which the controller is located, the controller may unsubscribe from the multicast subscriptions of the client device on behalf of the client device.

Although the controller typically acts in a passive manner by merely forwarding packets to the multicast router after snooping the packets, the controller may act on behalf of the client device when the client device leaves the IP subnet of the controller. By unsubscribing to the multicast subscriptions of the client device, the controller can prompt the multicast router to prune its list of recipients prior to the expiration of the amount of time the multicast router would typically wait prior to pruning its list of recipients. When no other client devices in the IP subnet of the controller are subscribed to a multicast stream, the multicast router may remove the IP subnet of the controller from its list of recipients for that multicast stream thereby improving the efficiency of the network bandwidth usage.

I. Terminology

Herein, certain terminology is used to describe features within embodiments of the invention. For example, the term "network device" generally refers to electronic equipment that may be configured with an antenna system that enables transmission and/or receipt of wireless messages over a wireless network. Hence, the network device is further adapted with circuitry to support wireless connectivity with other network devices being part of the wireless network. Different types of network devices may include, but are not limited or restricted to (1) a client device and (2) an edge device.

Herein, the term "client device" may refer to a stationary network device (e.g., desktop computer, television, set-top box, video gaming console, etc.) or a mobile network device capable of connecting to one or more wireless networks. Illustrative examples of mobile network devices may include, among others, a tablet, laptop, netbook, barcode scanner, a digital camera and/or a mobile handset such as a smartphone or a personal digital assistant "PDA." Likewise, the term "access point" of "AP" is a network device, a type of edge device in particular, that controls access to a network; where the AP may be deployed as a wired access point that features wired connectivity with one or more client devices or as a wireless access point that features wireless connectivity with one or more client devices. Of course, the AP also may represent other types of edge devices such as a wireless base station, a cellular base station or any device figured as a hot spot or gateway for network connectivity.

It is contemplated that a network device includes hardware logic such as one or more of the following: (i) processing circuitry; (ii) one or more communication interfaces such as a radio (e.g., component that handles the wireless data transmission and/or reception) and/or a physical connector to support wired, connectivity; and/or (iii) memory in the form of a non-transitory computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; etc.); or any connector for receiving a portable memory device such as a Universal Serial Bus "USB" flash drive, portable hard disk drive, or the like.

Herein, the term "logic" is generally defined as hardware and/or software. For example, as hardware, logic may include processing circuitry (e.g., a microcontroller, any type of processor, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, a source code, an object code, a shared library/dynamic load library, or one or more instructions. These software modules may be stored in any type of a suitable non-transitory storage medium (described above) or transitory computer-readable transmission media (e.g., electrical, optical acoustical or other form of propagated signals such as carrier waves, infrared signals, digital signals).

The term "link" is a physical or logical communication path between two or more network devices. Examples of a link may include a wireless link that supports the transfer of wireless messages over certain radio frequency (RF) channels and/or bands or cellular frequency channels and/or bands, as well as the logic associated therewith.

The term "message" generally refers to information transmitted as information in a prescribed format, where each message may be in the form of a packet, a frame, an IEEE 802.11 frame, or any other series of bits having the prescribed format.

The term "control scope" refers to the network serviced by a cluster of controllers. For instance, the control scope of a cluster of controllers may comprise all access points (APs) and client devices serviced by the cluster of controllers.

The term "table" refers to an arrangement of data according to a selected organization. Examples of a "table" may include, but are not limited or restricted to, a collection of one or more rows and columns, a bucket map, a linked list, a hash table or any other data structure that maintains correspondence of data. A table may store a plurality of data.

Lastly, the terms "or" and "and/or" as used herein are to be interpreted as an inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different, forms, it is intended that the present disclosure is to be considered as an example of the principles of the invention and not intended to limit the invention to the specific embodiments shown and described.

B. Communication Network Including Multiple IP Subnets

Referring to FIG. 1, a diagram of an exemplary network system including a multicast router is shown. The communication network 105 includes a multicast router 100, the controllers 120, 121, 160 and 161, the APs 130, 131 and 170, and the client devices 140-143 and 180. Each of the controllers 120, 121, 160 and 161 are communicatively coupled to the multicast rooter 100.

The client devices 140-142 are associated with the AP 130, which is associated with the controller 120. The client device 143 is associated with the AP 131, which is associated with the controller 121. The client device 180 is associated with the AP 170, which is associated with the controller 161.

The communication network 105 also includes an Internet Protocol (IP) subnet 110 and an IP subnet 150. The controllers 120 and 121 are located within the IP subnet 110 while the controllers 160 and 161 are located within the IP subnet 150.

In the embodiment illustrated in FIG. 1, one or more of the client devices 140-143 and/or 180 may desire to subscribe to a multicast stream from the multicast router 100 (e.g., join a multicast group). One or more of the client devices 140-143 and/or 180 may send a transmission to the multicast router 100 subscribing to one or more multicast streams. For example, the client device 140 may send a transmission to the multicast router 100 (via the AP 130 and the controller 120) subscribing to one or more multicast streams; the client device 140 serving as the source of the subscription (e.g., providing the multicast router 100 with its media access control (MAC) address). When the client device 140 sends a transmission to the multicast router 100 subscribing to one or more multicast streams, the controller 120 may snoop the transmission prior to forwarding the transmission to the multicast router 100.

The transmission sent by the client device 140 requesting to join one or more multicast groups may be in the form of any protocol or component therein, used for communicating using the internet layer of the Open System Interconnection (OSI) model. Examples of Internet layer protocols include, but are not limited or restricted to, the Internet Group Message Protocol (IGMP) and/or the Internet Control Message Protocol (ICMP). For example, the client device may transmit a request to join a multicast group via an IGMP Report message to the multicast router 100 subscribing to one or more multicast streams when the Internet Protocol version 4 (IPv4) is used. Alternatively, when the Internet Protocol version 6 (IPv6) is used, a Multicast Listener Discovery (MLD) Report may be transmitted in order to join a multicast group. The term "IGMP join message" will be used herein to represent a request to join a multicast group but should not be limited to only the IGMP format.

In the above example, the controller 120 snoops the transmission subscribing to one or more multicast streams but does not intervene or act as the source of the subscription. However, the controller 120 adds an entry to a multicast stream subscription table storing (i) the client device 140 and (ii) the multicast stream to which the client device 140 subscribed. The multicast stream subscription table allows the controller 120 to maintain a recording of each multicast subscription of each client device associated with the controller 120 (e.g., via the AP 130).

Each controller maintains its own multicast stream subscription table and is therefore able to limit the flooding of multicast streams to the controller. For example, when only the client device 140 has subscribed to a first multicast stream ("MC_stream_A"), the controller 320 will obtain knowledge of this subscription by snooping the transmissions sent to the multicast router 100 from the client devices 140. In order to prevent unnecessary transmissions of MC_stream_A to the controller 120, upon the disassociation of the client device 140, the controller 120 may use its knowledge of the multicast stream subscriptions and send an IGMP Leave for MC_stream_A to the multicast router 100 on behalf of the client device 140. In turn, the multicast router 100 will cease the transmission of MC_stream_A to the controller 120. Therefore, the efficiency of the communication network 105 may be improved due to reduced network bandwidth usage.

Similarly to the discussion above regarding an "IGMP join message," a transmission to leave a multicast group may be in the form of any protocol, or component therein, used for communicating using the Internet layer of the OSI model. The term "IGMP Leave message" will be used herein to represent a request to leave a multicast group but should not be limited to the IGMP format.

The multicast stream subscription table of the controller 120 may allow the controller 120 to improve the efficiency of the network bandwidth usage between the controller 120 and the one or more APs associated with the controller 120. In one embodiment in which a plurality of APs are associated with the controller 120, the controller 120 may use the multicast stream subscription table to transmit one or more multicast streams to only the APs with which a subscribing client device is associated. Therefore, the controller 120 does not have to flood each AP with all multicast streams but may selectively forward only the multicast streams to which client devices associated with the AP are subscribed.

A. Client Device Roams Within IP Subnet

Figure 2:
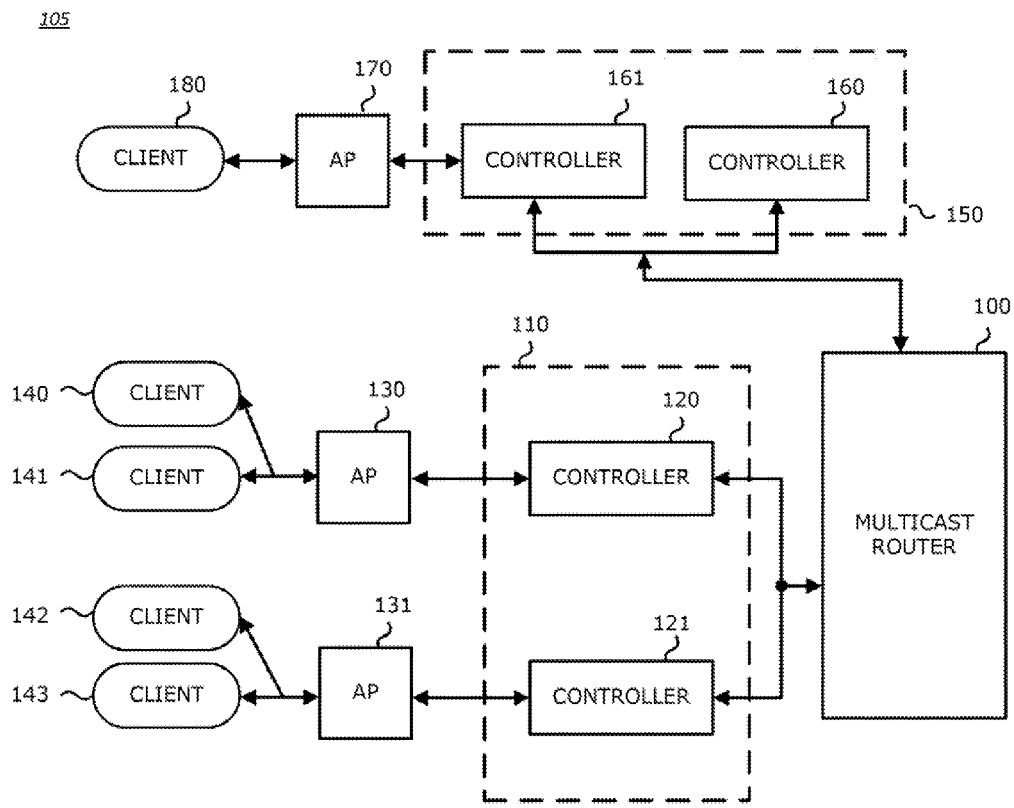
FIG. 2 is a diagram of the exemplary network system of FIG. 1 illustrating a roaming client device.

Referring to FIG. 2, a diagram of the exemplary network system of FIG. 1 illustrating a roaming client device is shown. FIG. 2 illustrates the communication network 105 where the client device 142 has roamed from the AP 130 to the AP 131. In this example, while still associated with the controller 120, the client device 142 subscribed to a multicast stream ("MC_stream_A"). Subsequently, the client device 142 disassociated with the controller 120 and associated, via the AP 131, with the controller 121.

The client device 142 may provide the controller 120 with an explicit disassociation, via the AP 130, or simply roam out of the range of the AP 130 and into the range of a second AP (e.g., the AP 131) that is associated with a second controller (e.g., the controller 121). Both scenarios will be discussed below.

1. Client Device Explicitly Disassociates From Controller

In one instance, the client device 142 explicitly disassociates from the controller 120. For example, the client device 142 may transmit a disassociation message to the AP 130. Upon disassociation from the controller 120 by the client device 142, notifying the multicast router 100 of the disassociation may be advantageous to the controller 120 and the communication network 105.

a. Client Device Sends Leave Message to Multicast Router

In the embodiment, in which the client device 142 sends an IGMP Leave message to the multicast router 100 for MC_stream_A, the controller 120 observes the IGMP Leave message while snooping the IGMP packets transmitted by the client device 142. As discussed above, the controller 120 maintains a multicast stream, subscription table to keep track of each subscription of each client device associated with the controller 120. Therefore, upon observing the IGMP Leave message transmitted by the client device 142, the controller 120 cleans up its multicast stream subscription table by removing the "client device 142—MC_stream_A" entry. The controller 120 does not have to take any further action as it is not acting as the source of the multicast subscription and the multicast router 100 knows to remove the "client device 142—MC_stream_A" entry from its own multicast stream subscription table (e.g., prune the list of recipients of MC_stream_A).

b. Client Device Does Not Send Leave Message to Multicast Router

In the embodiment in which the client device 142 explicitly disassociates with the controller 120 but does not send an IGMP Leave message to the multicast router 100 for MC_stream_A, the controller 120 may, in some embodiments, send an IGMP Leave message to the multicast router 100 on behalf of the client device 142.

In the embodiment illustrated in FIG. 2, the client device 142 has associated with the controller 121 after disassociating with the controller 120. When the client device 142 disassociates without sending an explicit disassociation, the controller 120 may learn of the association between the client device 142 and the controller 121 through an Address Resolution Protocol (ARP) message transmitted by the controller 121 or through snooping an IGMP Query transmitted by the multicast router 100. The controller 120 may obtain knowledge of the association between the client 142 and the controller 121 through an ARP message because the controllers 120 and 121 are located in the same IP subnet. In other words, ARP messages are transmitted among network devices operating on the same Layer 2 (data link layer) of the OSI model. Being located within the same IP subnet, the controllers 120 and 121 are within the same Layer 2 (e.g., are "Layer-2 connected") and therefore can communicate via ARP messages.

Upon receiving an explicit disassociation from the client device 142, the controller 120 will wait for a predetermined amount of time to determine whether the client device 142 associates with another controller within the IP subnet 110 (e.g., the controller 121). When the controller 120 learns of an association between the client device 142 and the controller 121 prior to the expiration of the predetermined amount of time, the controller 120 will clean up Its multicast stream subscription table by removing the "Client device 142—MC_stream_A" entry. The controller 120 does not send an IGMP Leave message to the multicast router 100 because the client device 142 has not left the IP subnet in which the controller 120 is located. The multicast router 100 transmits the multicast stream "MC_stream_A" to the controllers within the IP subnet 110 to be forwarded to the client device 142 by one of the controllers within the IP subnet 110. The controller 120 does not send an IGMP Leave message to the multicast router 100 because the multicast router 100 would then no longer transmit MC_stream_A to the IP subnet 110 (assuming no other client devices within the IP subnet 110 were subscribed to MC_stream_A).

2. Client Device Does Not Explicitly Disassociate from Controller

In a second instance, the client device 142 may roam out of the range of the AP 130, and disassociate from the controller 120, as no other APs are associated with the controller 120. In addition, the roaming by client device 142 may occur without the client device 142 explicitly disassociating from the AP 130. As mentioned above, notifying the multicast router that the client device 142 has disassociated, from the controller (20 may be advantageous for the controller 120 and the multicast router 100 in assisting in keeping multicast stream subscription tables up to date and using network bandwidth efficiently. In particular, the multicast router 100 should be notified when the client device 142 leaves the IP subnet 110.

a. Client Device Sends Leave Message to Multicast Router

The embodiment in which the client device 142 sends an IGMP Leave message to the multicast router 100 for MC_stream_A is the same regardless of whether the client device 142 explicitly disassociates from the controller 120. When an IGMP Leave message is transmitted by the client device 142, the controller 120 observes the IGMP Leave message while snooping the IGMP packets. As discussed above, the controller 120 maintains a multicast stream subscription table to keep track of each subscription of each client device associated with the controller 120. Therefore, upon observing the IGMP Leave message transmitted by the client device 142, the controller 120 cleans up its multicast stream subscription table by removing the "client device 142—MC_stream_A" entry. The controller 120 does not have to take any further action as it is not acting as the source of the multicast subscription and the multicast router 100 knows to remove the "client device 142—MC_stream_A" entry from its own multicast stream subscription table.

b. Client Device Does Not Send Leave Message to Multicast Router

In the embodiment in which the client device 142 does not send an IGMP Leave message to the multicast router 100 for MC_stream_A prior and does not explicitly disassociate from the controller 120, the controller 120 may send an IGMP Leave message to the multicast router 100 on behalf of the client device 142. When no explicit disassociation from, the client device 142 is received, the controller 120 may learn of the disassociation of the client device 142 from the AP 130.

In one embodiment, a predefined amount of time is allocated during which the AP 130 should receive a transmission from the client device 142 (e.g., an idle timer is predefined during which the AP 130 should receive a transmission). For example, the AP 130 may restart, an idle timer after each received transmission from the client device 142. Examples of transmissions from the client device 142 may include, but are not limited or restricted to, a heartbeat acknowledgement, a data packet to be forwarded by the AP 130 and/or an IGMP transmission. When the idle timer expires without the AP 130 receiving a transmission from the client device 142, the AP 130 determines that the client device 142 has disassociated from the AP 130 and alerts the controller 120. In one embodiment, the length of time comprising the idle timer may be longer than the predetermined amount of time the controller may wait before sending an IGMP Leave message after receiving an explicit disassociation as discussed above.

In the embodiment illustrated in FIG. 2, the client device 142 has associated with the controller 121. As discussed above, the controller 121 is located within the same IP subnet as the controller 120. The controller 120 learns of the association of the client device 142 with the controller 121 through, for example, an ARP message and/or an IGMP Query and does not send an IGMP Leave message for MC_stream_A on behalf of the client device 142. Therefore, the controller 120 does not send an IGMP Leave message to the multicast router 100 for MC_stream_A on behalf of the client device 142. The controller 120 cleans up its multicast stream subscription table while the controller 121 forwards MC_stream_A to the AP 131, which to turn forwards the multicast stream, to the client device 142.

B. Client Device Roams to Second IP Subnet

Figure 3:
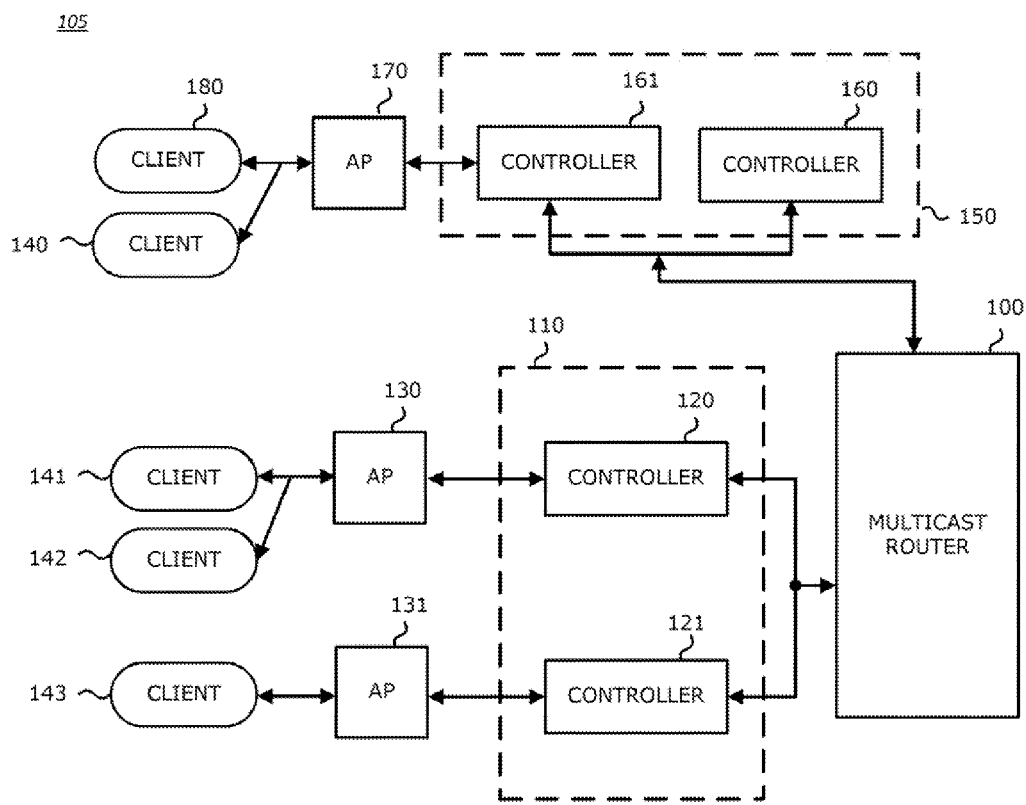
FIG. 3 is a diagram of the exemplary network system of FIG. 1 illustrating a second roaming client device.

FIG. 3 illustrates the communication network 105 where the client device 140 has roamed from the AP 130 to the AP 170. In this example, while still associated with the controller 120, the client device 142 subscribes to a multicast stream ("MC_stream_A"). Subsequently, the client device 142 disassociated with, the controller 120 and associated, via the AP 170, with the controller 161. As is illustrated, the controller 120 and the controller 161 are located in separate IP subnets, the IP subnet 110 and the IP subnet 150, respectively.

Similarly to the discussion above, the client device 140 may provide the controller 120 with an explicit disassociation, via the AP 130, or simply roam out of the range of the AP 130 and into the range of a second AP (e.g., the AP 170)

that is associated with a second controller (e.g., the controller 161). Both scenarios will be discussed below.

1. Client Device Explicitly Disassociates From Controller

In one instance, the client device 140 explicitly disassociates from the controller 120. For example, the client device 140 may transmit a disassociation message to the AP 130. Upon disassociation from the controller 120, it may be desirable to notify the multicast, router 100. In particular, when the client device 140 leaves the IP subnet 110, it is desirable for an IGMP Leave message to be sent to the multicast router 100 so that the multicast router 100 may keep its subscription stream table up to date and avoid sending unnecessary multicast transmissions.

a. Client Device Sends Leave Message to Multicast Rooter

As discussed above, a client device may transmit an IGMP Leave message to the multicast router. When the client device 140 sends an IGMP Leave message to the multicast router 100 for MC_stream_A, the controller 120 observes the IGMP Leave message while snooping the IGMP packets. Upon observing the IGMP Leave message transmitted by the client device 140, the controller 120 cleans up its multicast stream subscription table by removing the "client device 140—MC_stream_A" entry. The controller 120 does not have to take any further action as it is not acting as the source of the multicast subscription and the multicast router 100 knows to remove the "client device 140—MC_stream_A" entry from its own multicast stream subscription table.

b. Client Device Does Not Send Leave Message to Multicast Router

In the embodiment in which the client device 140 explicitly disassociates from the controller 120 but does not send an IGMP Leave message to the multicast router 100 for MC_stream_A prior to disassociating with the controller 120, the controller 120 may send an IGMP Leave message to the multicast router 100 on behalf of the client device 140.

In the embodiment Illustrated in FIG. 3, the client device 140 has associated with the controller 161 after disassociating with the controller 120. Unlike the embodiment illustrated in FIG. 2, when the client device 140 disassociates without sending an explicit disassociation, the controller 120 will not learn of the association between the client device 140 and the controller 161 through an ARP message transmitted by the controller 161 (e.g., a gratuitous ARP message) or through snooping an IGMP Query transmitted by the multicast router 100. The controllers 120 and 161 cannot communicate through an ARP message because the controllers 120 and 161 are located on separate IP subnets. In other words, because ARP messages are transmitted among network devices operating within the same IP subnet and the controllers 120 and 161 are located on separate IP subnets, ARP messages are not transmitted between the two.

In the embodiment illustrated in FIG. 3, the client device 140 has not associated with a controller within the same IP subnet as the controller 120. Therefore, upon receiving the explicit disassociation from the client device 140, the controller 120 will wait for a predetermined amount of time to ensure that the client device 140 does not associate with another controller within the IP subnet 110 (e.g., the controller 121). When the predetermined amount of time expires and the client device 140 has not yet associated with a controller in the IP subnet 110, the controller 120 will transmit an IGMP Leave message for MC_stream_A to the multicast router 100 on behalf of the client device 140. The IGMP Leave message will notify the multicast router 100 that the client device 140 is no longer located within the IP subnet 110, in addition, the controller 120 will clean up its multicast stream subscription table by removing the "Client device 140—MC_stream_A" entry. By sending an IGMP Leave message on behalf of the client device 140, the efficiency of the use of network bandwidth is improved.

2. Client Device Does Not Explicitly Disassociate from Controller

In a second instance, the client device 140 may roam out of the range of the AP 130, into the range of the AP 170, and therefore, disassociate from the controller 120. In addition, the roaming by the client device 140 may occur without the client device 140 explicitly disassociating from the AP 130. As mentioned above, it may be desirable for the multicast router 100 to be notified that the client device 140 has disassociated from the controller 120. In particular, the multicast router 100 should be notified when the client device 140 leaves the IP subnet 110.

a. Client Device Sends Leave Message to Multicast Router

The embodiment in which the client device 140 sends an IGMP Leave message to the multicast router 100 for MC_stream_A is the same regardless of whether the client device 140 explicitly disassociates. In addition, the controller 120 takes the same action when the client device 140 transmits an IGMP Leave message to the multicast router 100 and roams to a second IP subnet as when the roam log occurs within the same IP subnet.

As discussed above, when an IGMP Leave message is transmitted by the client device 140, the controller 120 observes the IGMP Leave message while snooping the IGMP packets. Subsequently, the controller 120 cleans up its multicast stream subscription table by removing the "client device 140—MC_stream_A" entry. Regardless of the fact that the client device 140 roamed from the IP subnet 110 to the IP subnet 150, the controller 120 does not have to take any further action as it is not acting as the source of the multicast subscription and the multicast router 100 knows to remove the "client device 140—MC_stream_A" entry from its own multicast stream subscription table.

b. Client Device Does Not Send Leave Message to Multicast Router

In the embodiment in which the client device 140 does not send an IGMP Leave message to the multicast router 100 for MC_stream_A prior and does not explicitly disassociate from the controller 120, the controller 120 may send an IGMP Leave message to the multicast router 100 on behalf of the client device 140. As discussed above, an idle timer may be predefined during which the AP 130 should receive a transmission from each of the associated client devices. When the idle timer expires without the AP 130 receiving a transmission from the client device 140, the AP 130 determines that the client device 140 has disassociated from the AP 130 and alerts the controller 120.

In the embodiment illustrated in FIG. 3, the client device 140 has associated with the controller 161, which is located in a separate IP subnet as the controller 120. Therefore, the controller 120 will not learn of the association of the client device 140 with the controller 161 through either an ARP message and/or an IGMP Query. However, the controller 120 may determine that the client device 140 has been assigned a new IP address through snooping dynamic host configuration protocol (DHCP) packets. The fact that the client device 140 has a new IP address indicates that client device 140 has left the IP subnet 110 and associated with a controller in a separate IP subnet. As a result, the controller 120 will transmit an IGMP Leave message for MC_stream_A to the multicast router 100 on behalf of the client device 140. In addition, the controller 120 cleans up its multicast stream subscription table by removing the "Client device 140—MC_stream_A" entry from the table.

By sending the IGMP Leave message on behalf of the client device 140, the controller 120 enables to the multicast router 100 to prune the multicast subscription tree for the multicast MC_stream_A by removing the IP subnet 110 when no other client, devices within the IP subnet 110 are also subscribed to MC_stream_A. Therefore, by sending the IGMP Leave message, the efficiency of the communication network 105 is improved. In particular, the amount: of bandwidth used by the multicast router 100 may be reduced.

C. Client Device Leaves the Network

Figure 4:
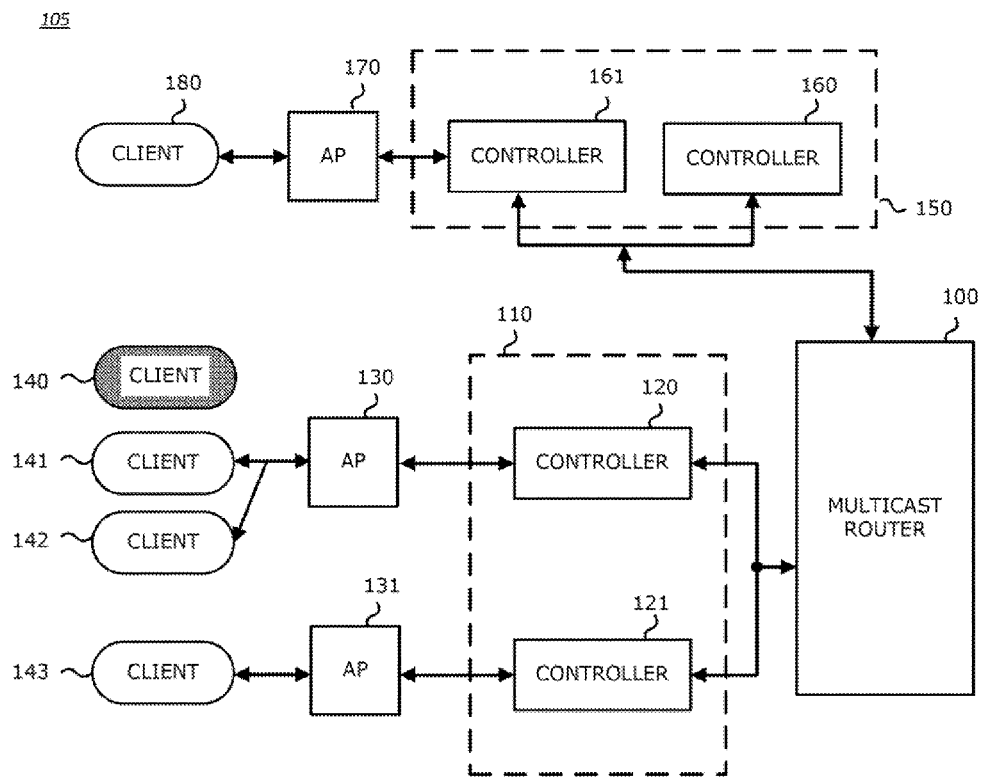
FIG. 4 is a diagram of a client device leaving the exemplary network system of FIG. 1.

Referring to FIG. 4, a diagram of the exemplary network system of FIG. 1 illustrating a client device leaving the communication network is shown. FIG. 4 illustrates the communication network 105 where the client device 140 left the communication network 105 by, for example, entering an inactive state. In this example, while still associated with the controller 120, the client device 140 subscribed to a multicast stream ("MC_stream_A"). Subsequently, the client device 140 entered an inactive state thereby disassociating with the controller 120. The client device 140 is illustrated as being in an inactive state (e.g., taken offline, placed in a suspended state, placed in a disabled state, etc.) with a shaded box.

The procedure followed by the controller 120 for determining whether to transmit an IGMP Leave message to the multicast router 100 when the client device 140 enters an inactive state is the same as when the client device 140 disassociates from the controller 120 and associates with a controller in a separate IP subnet (e.g., the controller 161 as shown in FIG. 3). As discussed above, the following three situations may arise when the client device 140 leaves the communication network 105: (1) the client device 140 sends an IGMP Leave message to the multicast router 100; (2) the client device 140 does not send an IGMP Leave message to the multicast router 100 but sends an explicit disassociation to the AP 130; and (3) the client device 140 sends neither an IGMP Leave message to the multicast router 100 nor an explicit disassociation to the AP 130.

In the first situation, when the client device 140 sends an IGMP Leave message to the multicast router 100, the controller 120 snoops the IGMP Leave message and cleans up its multicast stream subscription table by removing the "Client device 140—MC_stream_A" entry.

In the second situation, when the client device 140 does not send an IGMP Leave message to the multicast router 100 but sends an explicit disassociation to the AP 130, the controller 120 sends van IGMP Leave message for MC_stream_A on behalf of the client device 140 to the multicast router 100 because the client device 140 has not associated with a controller within the same IP subnet. In addition, the controller 120 cleans up its multicast stream subscription table by removing the "Client device 140—MC_stream_A" entry.

In the third situation, when the client device 140 sends neither an IGMP Leave message to the multicast router 100 nor an explicit disassociation to the AP 130, the controller 120 is alerted to the disassociation of the client device 140 after the expiration of an idle timer and sends an IGMP Leave message for MC_stream_A on behalf of the client device 140 to the multicast router 100 because the client device 140 has not associated with a controller within the same IP subnet. In addition, the controller 120 cleans up its multicast stream subscription table by removing the "Client device 140—MC_stream_A" entry.

d. Triggering Events for Transmitting an IGMP Leave Message by A Controller

Figure 5:
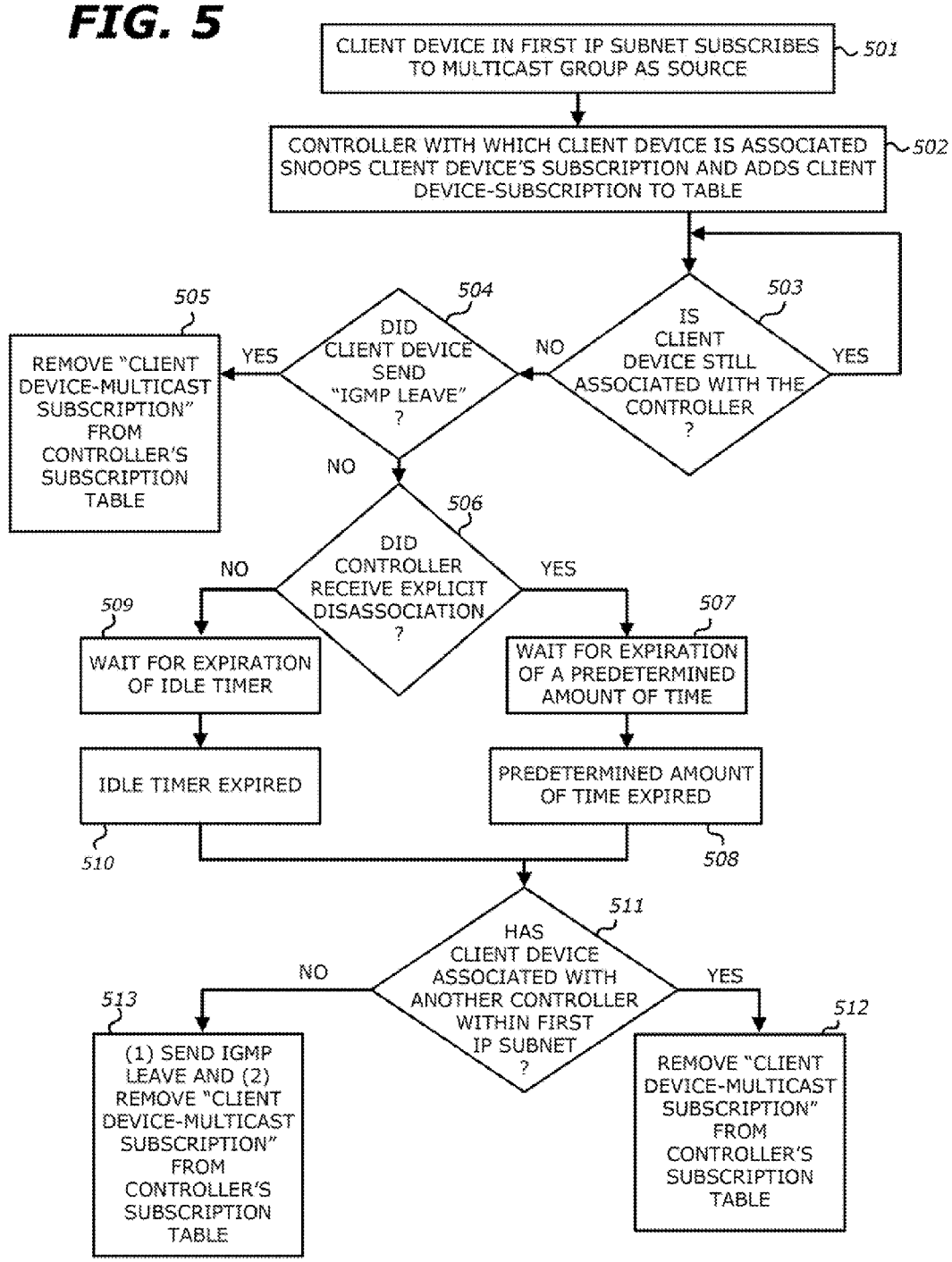
FIG. 5 is a flowchart illustrating an exemplary method for detecting triggering events that prompt a network device to end a multicast subscription of a client device.

Referring to FIG. 5, a flowchart illustrating an exemplary method for detecting triggering events that prompt a network device to end a multicast subscription of a client device is shown. Each block in FIG. 5 represents an operation performed in the exemplary method for detecting triggering events. In operation 501, a client device in a first IP subnet subscribes to a multicast stream as the source. For example, the client device may subscribe to the multicast stream by transmitting an IGMP Report message to the multicast router. In operation 502, the controller with, which the client device is associated snoops the IGMP Report message transmitted by the client device as the controller forwards the IGMP Report message to the multicast router. The controller subsequently adds the client device and the multicast stream to which the client device subscribed to a multicast stream subscription table that records each client device—multicast subscription pairing transmitted through the controller.

In operation 503, as Song as the client device remains associated with the controller, the controller continues to forward the multicast stream to which the client device subscribed (yes at operation 503). Alternatively, when the client device disassociates from the controller (no at operation 503), the controller determines whether the client device unsubscribed from the multicast stream (operation 504). The client device may unsubscribe via, for example, an IGMP Leave message. When the client device transmits an IGMP Leave message (yes at box 504), the controller removes the client device—multicast subscription pairing from its multicast stream subscription table (box 505). When the client device did not unsubscribe from the multicast stream (no at box 504), the controller determines whether the client device explicitly disassociated by sending a disassociation message from the controller (box 506).

When the client device explicitly disassociated from the controller (yes at box 506), the controller waits for a predetermined amount of time to determine whether the client device, after disassociating with the controller, associates with a second controller within the first IP subnet (box 507). When the predetermined amount of time has expired (box 508), the controller determines whether the client device has associated with a second controller within the first IP subnet (box 511).

When the client device associated with a second controller within the first IP subnet within the predetermined amount of time (yes at box 511), the controller removes the client device—multicast subscription pairing from its multicast stream subscription table (box 512). When the client device has not associated with a second controller within the first IP subnet within the predetermined amount of time (no at box 511), the controller transmits an IGMP Leave message for the multicast stream to the multicast router on behalf of the client device and removes the client device—multicast subscription pairing from its multicast stream subscription table (box 513).

Alternatively, when the controller does not receive an explicit disassociation from the client device (no at box 506), the controller waits for the expiration of an idle timer (e.g., the client device times out) (box 509). Without receiving an explicit disassociation, the controller will learn of the disassociation of the client device when the client device times out and is no longer transmitting any data to the controller (e.g., via an AP also associated with the controller). When the idle timer expires (box 510), the controller determines whether the client device has associated with a second controller within the first IP subnet (box 511). As stated above, when the client device associates with a second controller within the first IP subnet while the controller waits for the client device to time out (yes at box 511), the controller removes the client device—multicast subscription pairing from its multicast stream subscription table (box 512). When the client device has not associated with a second controller within the first IP subnet while the controller waited for the client device to time out (no at box 511), the controller transmits an IGMP Leave message for the multicast stream to the multicast router on behalf of the client device and removes the client device—multicast subscription pairing from its multicast stream subscription table (box 513).

Any combination of the above features and functionalities may be used in accordance with one or more embodiments, hi the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is Intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operation comprising:
   determining that, a client device, in a first Internet Protocol (IP) subnet, is subscribed to a multicast group;
   determining that the client device is no longer in the first IP subnet;
   responsive to determining that the client device is no longer in the first IP subnet, transmitting a message on behalf of the client device to unsubscribe the client device from the multicast group,
   wherein determining that the client device is no longer in the first IP subnet comprises determining that the client device is in a second IP subnet different than the first IP subnet.

2. The non-transitory computer readable medium of claim 1, the medium comprising instructions which, when executed by one or more hardware processors, causes performance of operation comprising determining that the client is no longer in the first IP subnet by at least performing the following:
   receiving a disassociation message from the client device for disassociating with a first access point in the first IP subnet; and
   determining that the client device has not associated with any other access point in the first IP subnet for a particular period of time subsequent to receiving the disassociation message.

3. The non-transitory computer readable medium of claim 2, the medium comprising instructions which, when executed by one or more hardware processors, causes performance of operation comprising determining that the client device has not associated with any other access point in the first IP subnet for the particular period of time by at least performing the following:
   determining that no message has been received for the particular period of time that indicates the client device has associated with another access point in the first IP subnet.

4. The non-transitory computer readable medium of claim 1, the medium comprising instructions which, when executed by one or more hardware processors, causes performance of operation comprising determining that the client is no longer in the first IP subnet by at least performing the following:
   determining that the client device timed out during while being associated with a first access point in the first IP subnet; and
   determining that the client device has not associated with any other access point in the first IP subnet for a particular period of time subsequent to receiving the disassociation message.

5. The non-transitory computer readable medium of claim 4, the medium comprising instructions which, when executed by one or more hardware processors, causes performance of operation comprising determining that the client device has not associated with any other access point in the first IP subnet for the particular period of time by at least performing the following:
   determining that no message has been received for the particular period of time that indicates the client device has associated with another access point in the first IP subnet.

6. The non-transitory computer readable medium of claim 1, the medium comprising instructions which, when executed by one or more hardware processors, causes performance of operation comprising determining that the client device is no longer in the first IP subnet by at least performing the following:
   determining that the client device is assigned a new IP address that does not correspond to the first IP subnet.

7. The non-transitory computer readable medium of claim 1, the medium comprising instructions which, when executed by one or more hardware processors, causes performance of operation comprising determining that the client device is subscribed to the multicast group by at least performing the following:
   snooping a message to join the multicast group transmitted by the client device.

8. The non-transitory computer readable medium of claim 1, wherein the message transmitted on behalf of the client device comprises a message to unsubscribe from the multicast group that identifies a MAC address of the client device as a source address.

9. The medium of claim 1, wherein the operations are performed by a controller in the first IP subnet.

10. A system comprising:
at least one device including a hardware processor and a non-transitory computer-readable storage medium;
the medium storing machine readable instructions to cause the hardware processor to:
determine that a client device, in a first Internet Protocol (IP) subnet, is subscribed to a multicast group;
determine that the client device is no longer in the first IP subnet;
responsive to determining that the client device is no longer in the first IP subnet, transmit a message on behalf of the client device to unsubscribe the client device from the multicast group,
wherein determining that the client device is no longer In the first IP subnet comprises determining that the client device is assigned a new IP address that does not correspond to the first IP subnet.

11. The system of claim 10, wherein the medium stores machine readable instructions to cause the hardware processor to determine that the client device is no longer in the first IP subnet by at least performing the following:
receiving a disassociation message from the client device for disassociating with a first access point in the first IP subnet; and
determining that the client device has not associated with any other access point in the first IP subnet for a particular period of time subsequent to receiving the disassociation message.

12. The system of claim 11, wherein the medium stores machine readable instructions to cause the hardware processor to determine that the client device has not associated with any other access point in the first IP subnet for the particular period of time by at least performing the following:
determining that no message has been received for the particular period of time that indicates the client device has associated with another access point In the first IP subnet.

13. The system of claim 10, wherein the medium stores machine readable instructions to cause the hardware processor to determine that the client device is no longer in the first IP subnet by at least performing the following:
determining that the client device timed out during while being associated with a first access point in the first IP subnet; and
determining that the client device has not associated with any other access point in the first IP subnet for a particular period of time subsequent to receiving the disassociation message.

14. The system of claim 13, wherein the medium stores machine readable instructions to cause the hardware processor to determine that the client device has not associated with any other access point in the first IP subnet for the particular period of time by at least performing the following:
determining that no message has been received for the particular period of time that indicates the client device has associated with another access point in the first access point.

15. The system of claim 10, wherein the medium stores machine readable instructions to cause the hardware processor to determine that the client device is no longer in the first IP subnet by at least performing the following:
determining that the client device is in a second IP subnet different than the first IP subnet.

16. The system of claim 10, wherein the medium stores machine readable instructions to cause the hardware processor to determine that the client device is subscribed to the multicast group by at least performing the following:
snooping a message to join the multicast group transmitted by the client device.

17. The system of claim 10, wherein the message transmitted on behalf of the client device comprises a message to unsubscribe from the multicast group that identifies a MAC address of the client device as a source address.

18. The system of claim 10, wherein the operations are performed by a controller in the first IP subnet.

19. A non-transitory computer readable medium comprising instructions which, when executed by one or more hardware processors, causes performance of operation comprising:
determining that, a client device, in a first Internet Protocol (IP) subnet, is subscribed to a multicast group;
determining that the client device is no longer in the first IP subnet;
responsive to determining that the client device is no longer in the first IP subnet, transmitting a message on behalf of the client device to unsubscribe the client device from the multicast group,
wherein determining that the client device is no longer in the first IP subnet comprises determining that the client device is assigned a new IP address that does not correspond to the first IP subnet.

* * * * *